United States Patent [19]

Schaefer et al.

[11] Patent Number: 5,343,458
[45] Date of Patent: Aug. 30, 1994

[54] METHOD OF STORING DIGITAL VIDEO, AUDIO AND CONTROL INFORMATION ON AN AN OPTICAL STORAGE MEDIUM

[75] Inventors: Louis F. Schaefer, Palo Alto; Hugh E. Frohbach, Sunnyvale; Gerald A. Pierce, Redwood City; Norman A. Peppers, Belmont, all of Calif.

[73] Assignee: SamSung Electronics Co., Ltd., Rep. of Korea

[21] Appl. No.: 944,977

[22] Filed: Sep. 15, 1992

[51] Int. Cl.⁵ .................................................. G11B 7/20
[52] U.S. Cl. ............................. 369/97; 369/44.18; 358/335
[58] Field of Search ................ 369/97, 44.18, 44.13; 360/19.1, 18, 77.17, 78.02, 77.12, 69; 235/454, 470; 358/310, 332, 333, 334, 335, 344, 345, 346, 347, 348

[56] References Cited

U.S. PATENT DOCUMENTS

| | | | |
|---|---|---|---|
| 4,264,986 | 4/1981 | Willis | 365/124 |
| 4,371,954 | 2/1983 | Cornet | 365/126 |
| 4,398,203 | 8/1983 | Cornet | 346/135.1 |
| 4,404,656 | 9/1983 | Cornet | 365/126 |
| 4,538,159 | 8/1985 | Gupta et al. | 346/135.1 |
| 4,567,585 | 11/1986 | Gelbart | 369/97 |
| 4,647,947 | 3/1987 | Takeoka et al. | 346/135.1 |
| 4,672,467 | 6/1987 | Heitmann | 360/19.1 X |
| 4,719,615 | 1/1988 | Feyrer et al. | 369/184 |
| 4,799,111 | 1/1989 | Ito | 360/19.1 X |
| 4,912,696 | 3/1990 | Feyrer et al. | 369/140 |
| 5,068,752 | 11/1991 | Tanaka et al. | 360/19.1 X |

Primary Examiner—Aristotelis Psitos
Assistant Examiner—Duncan Wilkinson
Attorney, Agent, or Firm—Burns, Doane, Swecker & Mathis

[57] ABSTRACT

The present invention relates to video recording and playback techniques and devices which create relative movement between a laser and an optical medium such as a flexible optical tape to permit the recording of different bandwidth signals. Further, the present invention relates to video recording and playback techniques and devices which optimize relative movement between a laser source and the optical medium in a cost-effective manner.

18 Claims, 2 Drawing Sheets

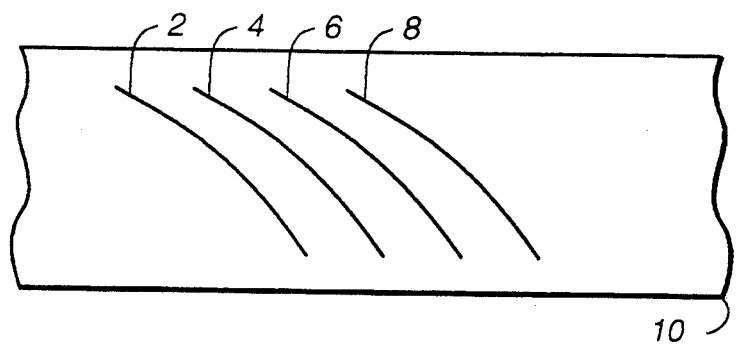
FIG._1
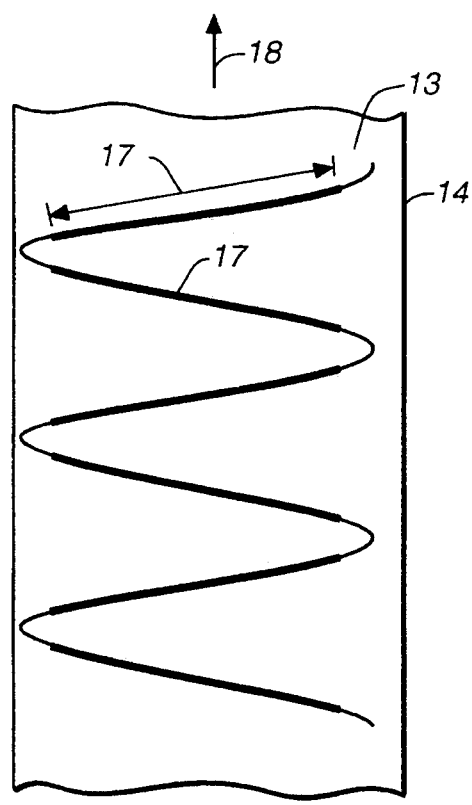
FIG._2

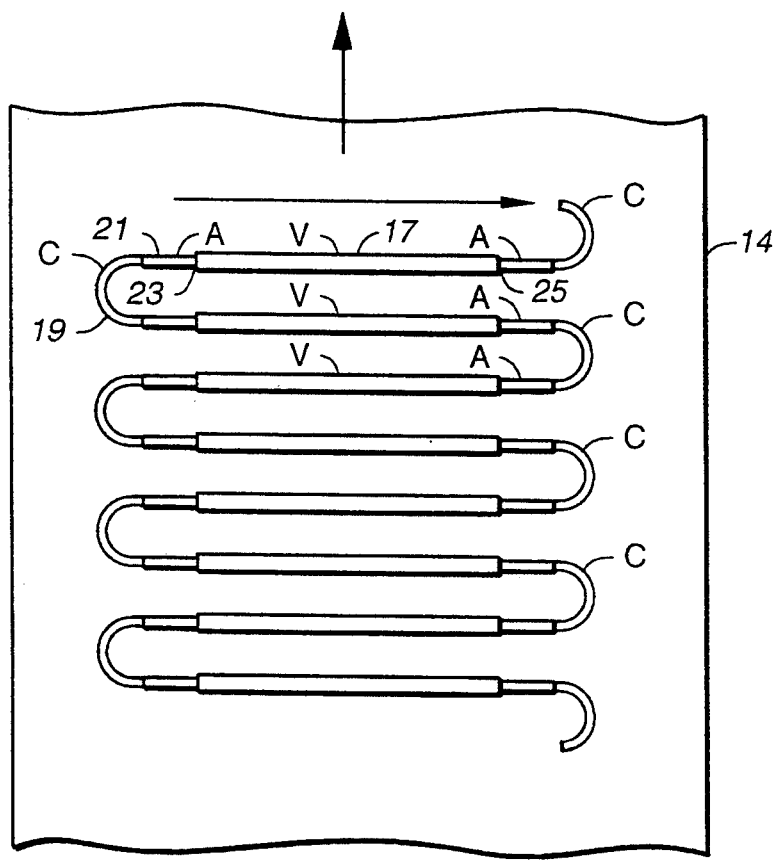
FIG._3
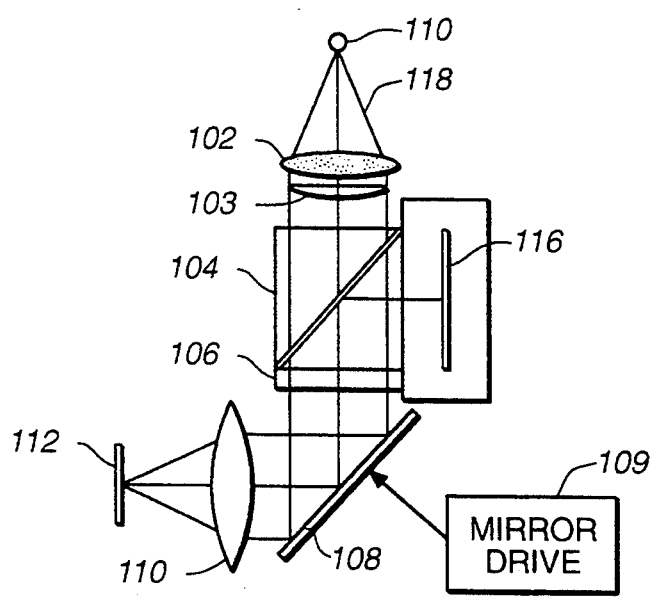
FIG._4

METHOD OF STORING DIGITAL VIDEO, AUDIO AND CONTROL INFORMATION ON AN AN OPTICAL STORAGE MEDIUM

BACKGROUND OF THE INVENTION

1. Field Of the Invention

The present invention relates generally to video recording and playback. More particularly, the invention relates to data formats for optical writing and reading of data with respect to a storage medium such as a flexible optical tape.

2. State of the Art

Presently, flexible tape for optical storage of data is known, as described in U.S. Pat. Nos. 4,719,615 and 4,912,696, both identified on their faces as being assigned to Optical Data, Inc. To optically record data on a medium such as a flexible optical tape, a beam of laser light is directed onto the tape. The laser beam melts the tape or burns holes in the tape to produce data spots representing bits of data. The data spots have a reflectivity, transmissivity or other optical characteristic which can be distinguished from the background of the optical tape.

Optically sensitive tape has not been effectively used to record high bandwidth signals. Thus, the commercial potential of optical tape to record signals such as television picture signals has not been effectively exploited.

Generally speaking, television pictures are comprised of snapshot-like "frames" that contain video signal information in horizontal scan lines organized by synchronizing signals. For example, according to the standards of the National Television Systems Committee (NTSC), each frame of video information comprises 525 horizontal scan lines. Further according to NTSC standards, the frame repetition rate is thirty frames per second, or 15,750 horizontal scan lines per second.

In practice, all of the video information in a complete television frame is not reproduced at a receiver simultaneously; instead, a technique known as interlaced scanning is used to reduce flicker. In interlaced scanning, each frame of video information is divided into two interlaced fields, each comprising a raster array of odd numbered or even numbered horizontal scan lines. Thus, if the horizontal scan lines of a 525-line NTSC frame were numbered sequentially from the top of a raster array, an odd-line field would comprise numbered horizontal scan lines 1, 3, 5, and so forth through frame line 525. Similarly, an even-line field would include numbered lines 2, 4, and so forth through line 524. According to the NTSC format, the field repetition rate is sixty fields per second.

In video recording systems that employ magnetic videotape as the recording medium, it is conventional to record each television field by using only a single track on the recording medium. This single track is traced by a recording head which helically scans the recording medium. (Helical recording heads are widely used because they provide high head-to-tape speed, usually exceeding one meter per second, with relatively slow moving tape.) FIG. 1 shows an example of four fields of video information recorded in parallel tracks 2, 4, 6 and 8, respectively, which extend at a small angle (e.g., 5 to 15 degrees) relative to the longitudinal edge of a magnetic videotape 10.

However, optical recording and playback of data poses significant problems which do not arise in traditional magnetic recording playback systems. For example, use of a laser to establish data spots representing bits of digital data or analog data on the flexible tape must be selected with practical limitations in mind. More particularly, in establishing relative movement between a laser and a flexible tape, there i.e. a limit to how rapidly the optical characteristics of a spot on the tape can be altered to form a data spot. Such a limit can be significant when, for example, the information being recorded represents a variety of different bandwidth signals; one of which corresponds to high frequency video information. Further, such a limitation can be significant when attempting to optimize space efficiency in recording information on the optical tape.

It would therefore be desirable to provide an optical system capable of writing and reading various bandwidth signals onto flexible optical tape. Further, it would be desirable to provide a cost effective system which could exploit this capability in a commercial environment such as television signal recording and playback for an optical VCR.

SUMMARY OF THE INVENTION

The present invention relates to video recording and playback techniques and devices which establish relative movement between a laser and an optical medium such as a flexible optical tape to record and play back data. Further, the present invention relates to video recording and playback techniques and devices which optimize relative movement between a laser source and the optical medium to record data having variable bandwidth components in a cost-effective manner. In a preferred embodiment, data spots having a predetermined feature size (i.e., hole size) are used to record information such as television signals. Further, recording on a flexible optical medium such as an optical tape is performed in a manner which optimizes recording efficiency on the tape.

In a preferred embodiment, the invention relates to a method for storing digital video information on an optical recording medium comprising the steps of storing first information with a first frequency bandwidth in a first linear portion of a scan trace on an optical recording medium; and storing second information with a second frequency lower than said first frequency bandwidth in a second portion of said scan trace. More particularly, the invention relates to a method for recording digital video information on an optical recording medium comprising the steps of: moving said optical recording medium in a first direction; scanning a beam of light over said moving optical recording medium in a second direction substantially perpendicular to said first direction; storing video information of a first frequency bandwidth in a substantially central, linear portion of said scan path on said optical recording medium; storing audio information associated with said video signal in a second portion of said scan path adjacent said first portion; and storing control information associated with said video signal in a third portion of said scan path, said second and third portions being located between consecutive first portions of said scan path.

BRIEF DESCRIPTIONS OF THE DRAWINGS

Other aspects of the present invention will become more apparent from the following detailed description of the preferred embodiments as described in conjunction with the accompanying drawings, in which:

FIG. 1 shows, as discussed above, scan traces of a playback head in a conventional video recording system;

FIG. 2 shows sinusoidal traces for recording and reading video information in accordance with the present invention;

FIG. 3 shows a more detailed data format for recording optical data on a flexible, optically sensitive tape in accordance with the present invention; and FIG. 4 shows an exemplary embodiment of a system for writing and reading data using a galvanometer scanning system.

DETAILED DESCRIPTION OF THE PREFERRED EMBODIMENTS

FIG. 2 shows an example of a generally sinusoidal trace 13 formed by a laser beam which is directed by a torsional, resonant-mirror galvanometer to travel across an optical recording tape 14 which moves slowly in the direction of arrow 18. It should be noted that video signal information can be recorded in both directions across the tape. In other words, recording can be done from left to right, and then from right to left across the tape as shown in FIG. 2. To preserve a video signal on a storage medium (e.g., flexible optical tape) such that it can be replayed at a later time, all video signal information including the traditional horizontal scan lines must be recorded.

A preferred data spot size used to represent video information is a circle having a diameter of approximately one micron. Data spots are preferably separated by at least two microns to permit their easy reading once recorded on the tape.

With regard to FIG. 2, it should be understood that the torsional galvanometer inherently provides non-continuous video recording. That is, video recording takes place when the laser beam traces over "active" portions of the recording medium, but does not occur during relatively non-linear periods, at the end of each trace, when the scanning motion of the laser beams is stopped and then reversed in direction.

"Active" portions 17 of sinusoidal trace 13 are defined as those relatively linear portions of the trace during which the tracing velocity is more than one-half of its value at the center of the trace. Relatively non-linear portions of the trace correspond to those remaining portions of the trace where the scanning velocity slows to reverse scanning direction.

In practice, the active portion of each trace occupies about 87 percent of the peak-to-peak amplitude of the trace and represents a duty cycle of approximately 67 percent. Television video information, encoded in digital or analog form, can be recorded in the active portions 17. The remaining portions of the traces are recorded at speeds which are too low for recording high frequency video signals. Accordingly, these remaining portions of the traces are used for recording lower frequency (i.e., low bandwidth) information.

Still further with regard to FIG. 2, it should be noted that the active portions 17 are nearly perpendicular to the longitudinal edges of tape 14. This orientation of recorded video information can be contrasted to the recorded tracks in FIG. 1 which are substantially non-perpendicular to the longitudinal edges of the tape. The near-perpendicular orientation of the traces allows improved implementation of special effects such as still, slow scan and fast scan of recorded video information as described in commonly assigned, co-pending U.S. application Ser. No. 07/817,622, filed Jan. 7, 1992, entitled "Video Tape Format Having Special Effects Capabilities", the disclosure of which is hereby incorporated by reference in its entirety.

FIG. 3 illustrates a formatting layout wherein recorded information is divided—spatially and temporally—between video, audio, and control information on optical recording tape 14. It should be understood that an optical deflection mechanism, such as the resonant-mirror galvanometer described above, can be used to record video information in centrally located active portions 17 of traces that extend substantially horizontally across the tape. Thus, in the exemplary embodiment shown, the video information recorded on each active portion 17 comprises an integral number of the horizontal scan lines of a television field. For example, the first horizontal active portion 17 includes four horizontal scan lines 2, 4, 6, and 8 from an even field of a television video frame; the second horizontal active portion includes four subsequent horizontal scan lines 10, 12, 14, and 16 from the same field, and so on.

Also with regard to FIG. 3, it should be understood that the left and right ends of each of the active scan portions include relatively non-linear second and third portions, for recording lower frequency audio and control data, respectively. The third portion is located between the audio portions of consecutive traces across the tape. The low frequency control data can include, for example, control information 19 that identifies the line number of the first horizontal scan line stored in the active scan portion following the data. Further, the control information can be scene information for enabling a particular portion of the recorded information to be quickly identified during playback.

Audio information 21 accompanies the recorded video information and can be encoded in digital form. This audio information can then be recorded at the left and the right ends 23 and 25 of each of the active scan portions.

Continuous input video signals represented by, for example, values of luminance (Y) and chrominance (C), as well as continuous audio signals can be converted into time-compressed bursts for writing on the optical tape. These bursts are timed to occur when the galvanometer is scanning the appropriate portions of the tape as defined by the FIG. 3 format. The conversion from continuous to intermittent representations of the information is accomplished using an electronic buffer capable of holding information during the time which corresponds to at least two galvanometer cycles. A technique for accomplishing this buffering is explained in greater detail in commonly assigned, co-pending U.S. application Ser. No. 07/944,622, filed Sep. 15, 1992, entitled "Buffering Method For Resonant Scanner".

More particularly, the aforementioned co-pending application describes a reading and writing technique which permits blocks of data that arrive at a constant rate to be recorded on a moving medium (i.e., flexible optical tape). The data can be written and read uniformly and without gaps, even though the resonant galvanometer has an independent and slightly higher constant frequency. Thus, an audio/video television signal can be recorded on the flexible optical tape using a fixed-frequency resonant torsional mirror galavonmeter for scanning back and forth across the moving tape.

The use of a self-resonant galavonmeter as the primary deflector provides significant advantages. For example, because this device is relatively simple in design (i.e., it does not require bearings or sliding parts), it possesses an almost infinite life. However, because it is self resonant, its frequency is not easily synchronized with periodic blocks of incoming data such as the horizontal scan lines of a television picture signal. It is for this reason that data associated with the horizontal scan lines is buffered in memory and supplied to the galvanometer on demand.

A galvanometer is selected which has a resonant period slightly shorter than that of the input data block period. Hence the galvanometer can record the information without data loss since it can empty the memory buffer faster than the buffer is filled by incoming data. Because the buffer can be emptied faster than it can be filled, there will necessarily by cyclic pauses during which the scanning device is ready for additional information but the buffer has not yet been filled. In these instances, the recording process is periodically halted for a complete galvanometer cycle while the input buffer is filled. This pause is referred to herein as "cycle-skip".

To provide the aforementioned "cycle-skip", an additional beam deflector is provided to deflect the beam in the direction of motion of the optical medium. This additional beam deflector can be used to effect the optical equivalent of an intermittent (i.e., start-stop) medium motion. Because the tape movement is uniform and continuous, this additional beam deflector accounts for the discrepancy between the uniform tape motion and the cycle-skip pauses in the data flow. Thus, traces can be formed on the tape continuously without gaps.

The aforementioned co-pending application illustrates a method by which a cycle-skip gap is kept from appearing on the flexible optical tape. As described in the co-pending application, a laser beam position coordinate as measured along the length of a tape can be plotted as a function of time. A buffer timing sequence represents that continuous, consecutively numbered blocks of input data are filling consecutive buffers at a uniform rate. A series of numbered blocks indicate the times at which corresponding buffers are written onto the tape. The sinusoidal transverse motion of the deflected beam is included as a time reference below the series of numbered blocks.

A sinuous path of consecutively numbered horizontal lines represents the positions on the tape at which correspondingly numbered source data blocks are recorded. No gaps exist in this column even though the data has been written intermittently. This is because a stair-step characteristic of position versus time profile for the laser position relative to the tape has been provided.

To generate the aforementioned stair-step motion, a correction signal is supplied to a resonant galvanometer scan compensation actuator. This correction signal corresponds to a difference between the stair-step profile and the constant speed of the tape. The total correction waveform is the sum of two components: (1) a fast period motion for linearizing the hi-directional traces; and, (2) a slower triangular motion needed to prevent gaps during the cycle-skip intervals. The fast period motion is described in commonly assigned co-pending application Ser. No. 07/944,978, filed Sep. 15, 1992, entitled "Bidirectional Sinusoidal Scanning" and is used to produce the nearly horizontal, parallel traces shown in FIG. 3 of the present application.

Each of the component deflections of the total correction waveform is relatively small, with neither of the signals exceeding the spatial galvanometer period (peak-to-peak). The sum of these signals is therefore also small. For example, a typical optical tape recording system would, for example, include a bi-directional galvanometer with a spatial period of 3.2 micrometers on the tape. Hence a deflection actuator capable of providing, for example, plus or minus 2 micrometers of spot movement along the velocity direction of the tape would be adequate. Such movement is well within the range of known piezoelectric actuators.

With FIG. 3 in mind, it can be understood that the relative speed between the playback head and optical tape 14 can be selected so that all of the horizontal scan lines in frames of video information which are recorded on the tape can be read. The low-frequency control information which is recorded at the beginning and/or end of each active scan on the optical tape permits the playback head to identify the horizontal scan lines which are read.

In the normal playback mode, the playback head moves along an optical tape at the same speed as the recording head, and recorded video information is read from each of the recorded lines on the tape. For the example discussed above in conjunction with FIG. 3, the playback head first reads horizontal scan lines 2, 4, 6 and 8 from the first recorded active portion and next reads horizontal scan lines 16, 14, 12 and 10 (in that order) from the second recorded active portion. The read mechanism buffers the information read and the buffered information is provided to a field memory or to a video monitor in the correct reverse order (i.e., 10, 12, 14, 16). Thus, in a normal playback mode, the field memory is continually updated.

FIG. 4 corresponds to commonly assigned co-pending application Ser. No. 07/812,947 filed Dec. 24, 1991 and allowed as U.S. Pat. No. 5,237,556, entitled "Wide Beam Detector System for Optical Memories" and illustrates use of a light beam that is scanned cross-wise relative to tape movement for reading data stored on the optical recording medium. A similar scanning device can be used for writing data on the tape using data formats as described in the present invention.

In FIG. 4, a means for illuminating an optical tape 112 includes a solid state semiconductor laser 100. Means for transmitting light 118 from the laser 100 to the optical tape includes a collimating lens 102, a light expanding means 103, a polarizing beam splitter 104, a quarter wave plate 106, a scanning galvanometer mirror 108 (and scanning mirror drive 109) and a focusing lens 110. As shown in the FIG. 4 embodiment, light expanding means includes a cylindrical lens 103. This cylindrical lens i.e. removed from the light beam path during recording.

A means for reading information from the optical tape includes the focusing lens 110, the scanning galvanometer mirror, the polarizing beam splitter 104, and a detector array 116. The detector array 116 includes a series of light detector elements (e.g., PIN photodiodes) which are arranged in a substantially straight line.

The detector array must be wide enough to match the tolerance of lateral optical tape movement and the illumination spread of the illumination system. That is, the detector array must be able to detect light reflected from the tracks of the optical tape 112 over the entire range of expected side to side optical misalignments as described in the aforementioned U.S. Pat. No. 5,237,556, the disclosure of which is hereby incorporated by reference in its entirety.

The light beam 118 is reflected off of the galvanometer mirror 108 to the focusing lens 110 which focuses the light beam onto the optical tape 112. In a preferred embodiment, the beam is scanned back and forth across the tape along a substantially sinusoidal path as described previously.

To read the information stored on the tape, the FIG. 4 light beam 118 is transmitted toward the optical tape 112 and reflected by data spots recorded thereon. Light reflected from the data spots is collected by the focusing lens 110 and directed toward a stationary detector array 116 via the scanning galvanometer mirror 108 and the polarizing beam splitter 104.

When light reflected from the optical tape 112 strikes one or more of the light detecting elements, the light detecting elements produce electrical signals. These electrical signals are evaluated to identify the presence of data spots on the optical tape. As previously mentioned, these data spots are representative of analog or digital information, including tracking and focusing information.

The scanning galvanometer mirror is oscillated at a predetermined frequency in a direction transverse relative to tape movement. Light directed toward the flexible tape is thereby scanned back and forth across the tape. Similarly, light reflected by data spots stored across the tape (i.e., in tracks perpendicular relative to tape movement) is directed to the stationary detector via the scanning galvanometer mirror.

The predetermined frequency at which the galvanometer oscillates is selected on the basis of tape speed movement. The galvanometer mirror can be controlled in a manner as described in the aforementioned copending U.S. application Ser. No. 07/944,978, entitled "Bidirectional Sinusoidal Scanning", the disclosure of which is hereby incorporated by reference in its entirety.

Because the galvanometer reaches its highest speed during the central, substantially linear active portion 17 (FIG. 3), higher frequency information (e.g., video information) is recorded in this region. During direction reversals of the scanning beam, the galvanometer speed decreases. Rather than waste this time period, the present invention exploits this reversal time to record lower frequency audio and control information as described above.

Although the exemplary embodiment described above has been discussed in the context of an optical system which uses flexible optical tape, it will be appreciated that the invention can be applied to any scanning system which optically records or reads data. Further, although an exemplary embodiment has been described in the context of a television video signal, it will be appreciated that any signals can be recorded using the above-identified technique. However, use of the preferred embodiment with a signal which includes a plurality of different bandwidth components (e.g., video and audio) permits optimal use of the data formats described herein for writing onto a storage medium such as a flexible optical medium.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. Method for storing digital video information on an optical recording medium comprising the steps of:
   storing first information with a first frequency bandwidth in a first linear portion of a scan trace on an optical recording medium; and
   storing second information with a second frequency bandwidth different from said first frequency bandwidth in a second non-linear portion of said scan trace adjacent said first portion.

2. Method according to claim 1, wherein said step of storing said first information further includes the step of:
   scanning at a speed relative to the recording medium speed which permits video signal information associated with video signal fields to be stored during consecutive scan cycles.

3. Method according to claim 2 wherein said step of storing second information further includes the step of:
   scanning at a speed relative to the recording medium speed which permits audio signal information associated with an audio signal to be stored during consecutive scan cycles.

4. Method according to claim 3 wherein said step of storing second information further includes the step of:
   scanning at a speed relative to the recording medium speed which permits control information associated with a video signal field to be stored during consecutive scan cycles.

5. Method according to claim 2 wherein said step of scanning further includes a step of:
   recording a fraction of said video signal field in said first linear portion.

6. Method according to claim 5 wherein said optical recording medium is a flexible optical tape.

7. Method according to claim 3 wherein said audio information recorded in said second portion corresponds with video information stored in said first portion.

8. Method according to claim 4 wherein said control information includes line number information identifying at least one horizontal scan line number recorded in said first portion.

9. Method according to claim 8 wherein said optical recording medium is a flexible optical tape.

10. Method for recording digital video information on an optical recording medium comprising the steps of:
    moving said optical recording medium in a first direction;
    scanning a beam of light over said moving optical recording medium in a second direction to form a scan path which is substantially perpendicular to said first direction;
    storing video information of a first frequency bandwidth in a substantially central, linear portion of said scan path on said optical recording medium;
    storing audio information associated with said video signal in a second portion of said scan path adjacent said first portion; and
    storing control information associated with said video signal in a third non-linear portion of said scan path, said second and third portions being located between consecutive first portions of said scan path.

11. Method according to claim 10 wherein steps of storing video information includes a step of:

scanning at a speed relative to the recording medium speed which permits signal information associated with video signal fields to be stored during consecutive scan cycles.

12. Method according to claim 11 wherein said step of storing second information further includes the step of:

scanning at a speed relative to the recording medium speed which permits audio signal information associated with an audio signal to be stored during consecutive scan cycles.

13. Method according to claim 12 wherein said step of storing second information further includes the step of:

scanning at a speed relative to the recording medium speed which permits control information associated with a video signal field to be stored during consecutive scan cycles.

14. Method according to claim 11 wherein said step of scanning further includes a step of:

recording a fraction of said video signal field in said first linear portion.

15. Method according to claim 14 wherein said optical recording medium is a flexible optical tape.

16. Method according to claim 12 wherein said audio information recorded in said second portion corresponds with video information stored in said first portion.

17. Method according to claim 13 wherein said control information includes line number information identifying at least one horizontal scan line number recorded in said first portion.

18. Method according to claim 17 wherein said optical recording medium is a flexible optical tape.

* * * * *